(12) United States Patent
Watanabe et al.

(10) Patent No.: US 6,204,627 B1
(45) Date of Patent: Mar. 20, 2001

(54) MOTOR CONTROL APPARATUS

(75) Inventors: Shinji Watanabe; Masahiro Inaniwa; Noriyasu Matsufuji; Satoshi Numata; Takahiro Fujimaki, all of Hitachinaka (JP)

(73) Assignee: Hitachi Koki Co. Ltd., Tokyo (JP)

( * ) Notice: Subject to any disclaimer, the term of this patent is extended or adjusted under 35 U.S.C. 154(b) by 0 days.

(21) Appl. No.: 09/374,114

(22) Filed: Aug. 16, 1999

(30) Foreign Application Priority Data

Aug. 18, 1998 (JP) .................................................. 10-231910

(51) Int. Cl.[7] .......................... B04B 13/00; H02M 7/539
(52) U.S. Cl. .......................... 318/729; 318/759; 318/730; 363/34; 363/39
(58) Field of Search .................................... 318/448, 376, 318/729, 759; 363/54, 160, 34, 8, 39, 98, 40, 71; 323/207; 166/248

(56) References Cited

U.S. PATENT DOCUMENTS

| 4,520,494 | * | 5/1985 | Arita et al. ............................. 378/108 |
| 4,855,887 | * | 8/1989 | Yamato et al. .......................... 363/8 |
| 5,012,868 | * | 5/1991 | Bridges ............................... 166/248 |
| 5,608,301 | | 3/1997 | Inaniwa et al. . |
| 5,731,681 | | 3/1998 | ditto . |
| 5,771,161 | * | 6/1998 | Jackson et al. ......................... 363/40 |

FOREIGN PATENT DOCUMENTS 7-246351   9/1995  (JP) .

* cited by examiner

Primary Examiner—Paul Ip
(74) Attorney, Agent, or Firm—Connolly Bove Lodge & Hutz, LLP

(57) ABSTRACT

A transformer outputs different (high or low) secondary voltages. A switch outputs high or low secondary voltage according to a mode signal. An electric power converter including a rectifying circuit and a switching circuit either charges a smoothing capacitor with an output of the switch or discharges the smoothing capacitor to supply a regenerative current toward the transformer with a power fact improved. An phase signal generation circuit generates PWM or PAM phase signals in accordance with the mode signal. An inverter circuit generates driving signals supplied to the motor in response to the phase signals from power from the smoothing capacitor. A mode determining circuit determines one of modes to generate the mode signal in accordance with a speed command signal and acceleration/deceleration which is indicated by the rotating speed signal and the rotating speed command signal.

16 Claims, 12 Drawing Sheets

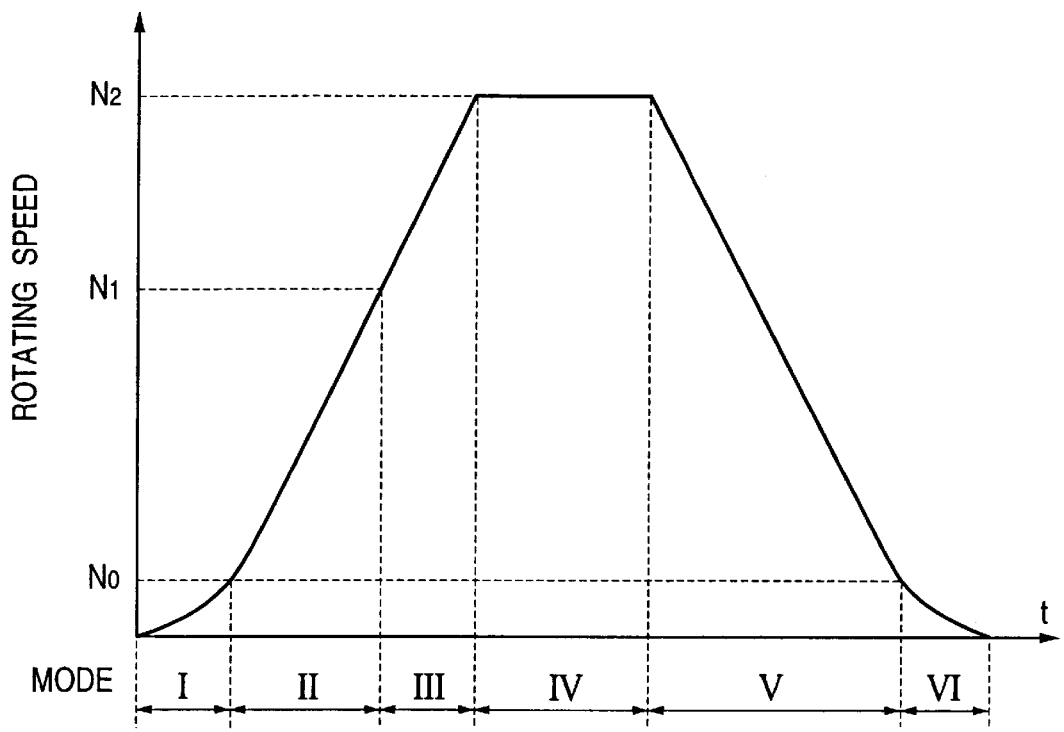

1

MOTOR CONTROL APPARATUS

BACKGROUND OF THE INVENTION

1. Field of the Invention

This invention relates to a motor control apparatus for controlling the rotation of a motor.

2. Description of the Prior Art

A motor control apparatus including electric power converter for controlling the rotation of a motor is known. Such a prior art motor control apparatus is disclosed in Japanese patent application provisional publication No. 7-246351 (corresponding U.S. Pat. No. 5,608,301 and U.S. Pat. No. 5,731,681). The electric power converter acts as a voltage up converter which converts the ac power from a transformer to a dc power in a smoothing capacitor in a power running condition and acts as a voltage down converter which converts the dc power to return the power to the ac side in a regenerative operation.

SUMMARY OF THE INVENTION

The aim of the present invention is to provide an improved motor control apparatus.

According to this invention, there is provided a first motor control apparatus for a centrifugal apparatus which includes: an ac power source; a transformer for converting a voltage of the ac power source; an electric power converter connected to the transformer; a smoothing capacitor; a power factor improving control circuit for controlling the electric power converter and adjusting a charge voltage of the smoothing capacitor; an inverter converter for a motor connected to the smoothing capacitor; a switch provided between a plurality of secondary voltage taps provided to the transformer and the electric power converter for switching among a plurality of secondary voltage taps; and an inverter control circuit for controlling the inverter converter for the motor and switching between the pulse width modulation controlling and the pulse amplitude modulation.

In the first motor control apparatus may further include a central processing unit for controlling the power factor improving control circuit and the inverter controlling circuit. The central processing unit is supplied with a rotation signal of the motor for controlling the inverter converter for the motor by the pulse width modulation controlling and the pulse amplitude controlling.

In the first motor control apparatus, the switching between the pulse width modulation controlling and the pulse amplitude modulation is effected by selecting a plurality of patterns stored.

In the first motor control apparatus, when the motor is started up, the selection switch selects a low voltage of the secondary tap, the power factor improving control circuit adjusts a voltage of a dc voltage voltage-up-converted by the electric power converter to a constant low voltage, and the inverter control circuit includes the selection switch for selecting the pulse width modulation controlling to pulse-width-modulation-control the inverter converter for the motor and a control circuit for controlling the power improving control circuit and the inverter control circuit.

In the first motor control apparatus, when the motor is accelerated, the selection switch selects a high voltage of the secondary tap, the power factor improving control circuit adjusts a voltage of a dc voltage voltage-up-converted by the electric power converter to a constant high voltage, and the inverter control circuit includes the selection switch for selecting the pulse width modulation controlling to pulse-width-modulation-control the inverter converter for the motor and a control circuit for controlling the power improving control circuit and the inverter control circuit.

In the first motor control apparatus, when the motor is accelerated at a high speed rotating speed range, the selection switch selects a high voltage of the secondary tap, the power factor improving control circuit adjusts a voltage of a dc voltage voltage-up-converted by the electric power converter to a constant high voltage, and the inverter control circuit includes the selection switch for selecting the pulse amplitude modulation controlling to pulse-amplitude-modulation-control the inverter converter for the motor and a control circuit for controlling the power improving control circuit and the inverter control circuit.

In the first motor control apparatus, when the motor is at a high speed rotating speed within a high speed rotating speed range, the selection switch selects a low voltage of the secondary tap, the power factor improving control circuit adjusts a voltage of a dc voltage voltage-up-converted by the electric power converter to a constant low voltage, and the inverter control circuit includes the selection switch for selecting the pulse amplitude modulation controlling to pulse-amplitude-modulation-control the inverter converter for the motor and a control circuit for controlling the power improving control circuit and the inverter control circuit.

According to the present invention, a second motor control apparatus for controlling a motor is provided which includes a transformer for receiving an ac power and outputting different secondary voltages; a switch for outputting one of different secondary voltages in accordance with a mode signal; a smoothing capacitor; a electric power converter including a rectifying circuit and a switching circuit for either charging the smoothing capacitor with an output of the switch or discharging the smoothing capacitor to supply a regenerative current from the motor to the transformer to control a voltage of the smoothing capacitor in accordance with the mode signal; a rotating speed detector for detecting a rotating speed and a position of the motor to generate a rotating speed signal; a drive signal generation circuit including a pulse width modulation circuit and a pulse amplitude modulation circuit for generating either of first phase signals by the pulse width modulation circuit or second phase signals by the pulse amplitude modulation circuit in accordance with the mode signal, pulse widths of the first phase signals being controlled by the pulse amplitude modulation circuit in accordance with the rotating speed command signal and the rotating speed signal such that a difference between the rotating speed command signal and the rotating speed is reduced, the second phase signals being generated by the pulse amplitude modulation circuit such that a slip frequency between the second phase signals and rotation of a rotor of the motor is controlled in accordance with the rotating speed command signal and rotating speed signal; an inverter circuit for generating driving signals supplied to the motor in response to an output of the drive signal generation circuit with power from the smoothing capacitor; and a mode determining portion for determining one of modes to generate the mode signal in accordance with a speed command signal and the rotating speed signal.

In the second motor control apparatus, the pulse width modulation circuit may have a first memory for storing sets of different PWM switching data patterns and generate the first phase signals by successively outputting one of the PWM switching data patterns of one sets in accordance with the rotating speed signal and the rotating speed command signal and the pulse amplitude modulation circuit may include a second memory for storing a set of PAM switching data patterns and generate the second phase signals by successively outputting one of the set of PAM switching data patterns in accordance with the rotating speed signal.

The second motor control apparatus may further include a voltage detector for detecting a voltage of the smoothing capacitor. The different secondary voltages may include a low ac voltage and a high ac voltage. The electric power converter may control the voltage of the smoothing capacitor to either of high or low output voltage. The modes may include first to sixth modes. The first mode is effected when the rotating speed signal is less than No and the rotating speed and the rotating speed command signal indicates acceleration. The second mode is effected when the rotating speed signal is not less than N0 and less than N1 which is greater than the N0 and the rotating speed and the rotating speed command signal indicates acceleration. The third mode is effected when the rotating speed signal is not less than N1 and less than N2 which is greater than the N1 and the rotating speed and the rotating speed command signal indicates acceleration. The fourth mode is effected when the rotating speed signal is substantially equal to N2 and the rotating speed and the rotating speed command signal indicates a constant rotating speed. The fifth mode is effected when the rotating speed signal is equal to or less than N2 and not less than N1 and the rotating speed and the rotating speed command signal indicates deceleration. The sixth mode is effected when the rotating speed signal is less than N0 and the rotating speed command signal indicates deceleration. In this case, in the second mode, the switch outputs the high ac voltage and the electric power converter controls the voltage of the smoothing capacitor to the high output voltage using the voltage detector, and the drive signal generation circuit operates pulse width modulation circuit. Moreover, in this case, in the fourth mode, the switch outputs the low ac voltage, the electric power converter controls the voltage of the smoothing capacitor to the low output voltage using the voltage detector, and the drive signal generation circuit operates pulse amplitude modulation circuit.

Moreover, in this case, in the third mode, the switch outputs the high ac voltage, the electric power converter controls the output of the smoothing capacitor to the high output voltage using the voltage detector, and the drive signal generation circuit operates the pulse width modulation circuit.

Moreover, in this case, in the first and sixth modes, the switch outputs the low ac voltage, the electric power converter controls the output of the smoothing capacitor to the low output voltage, and the drive signal generation circuit operates the pulse width modulation circuit.

In the second motor control apparatus, the different secondary voltages may includes a low ac voltage and a high ac voltage. The electric power converter may control the output of the smoothing capacitor to a high output voltage and the switch may output the high ac voltage when the rotating speed signal and the rotating speed command signal indicates acceleration and deceleration and the rotating speed is not less than a reference speed. The electric power converter may control the output of the smoothing capacitor to a low output voltage and the switch may output the low ac voltage when the rotating speed signal and the rotating speed command signal indicates acceleration and deceleration and the rotating speed signal is less than the reference speed.

BRIEF DESCRIPTION OF THE DRAWINGS

The object and features of the present invention will become more readily apparent from the following detailed description taken in conjunction with the accompanying drawings in which:

FIG. 2 is a graphical drawing of this embodiment showing mode change;

FIG. 3 is a table of this embodiment showing the control condition with respect to the mode of the motor control apparatus;

The same or corresponding elements or parts are designated with like references throughout the drawings.

DETAILED DESCRIPTION OF THE INVENTION

Hereinbelow will be described an embodiment of this invention.

Figure 1:
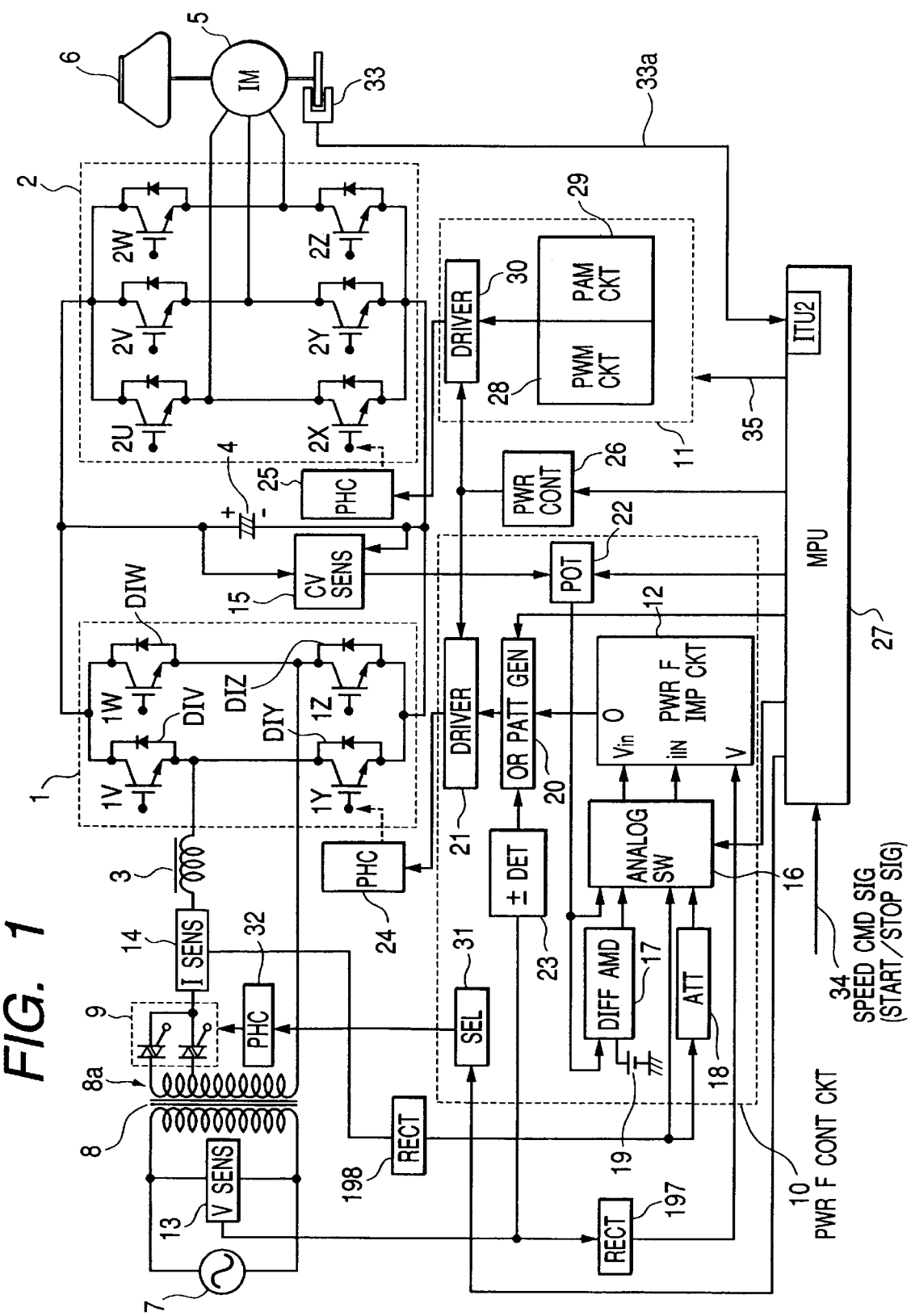
FIG. 1 is a block diagram of a motor control apparatus of an embodiment of this invention.

FIG. 1 is a block diagram of a motor control apparatus of an embodiment of this invention. FIG. 2 is a graphical drawing of this embodiment showing mode change. FIG. 3 is a table of this embodiment showing the control condition with respect to the mode of the motor control apparatus.

A transformer 8 receives an ac power of which voltage is detected by a voltage sensor 13. The transformer 8 having a plurality of taps 8a to output different secondary voltages (high and low). A switch circuit 9 outputs either of a high secondary voltage and a low secondary voltage in accordance with an output of a selector 31. An output of the switch circuit 9 supplied to an (bidirectional) electric power converter 1 including a rectifying circuit through a current sensor 14 and a reactor 3. The electric power converter 1 rectifies the output of the switch circuit 9 with diodes D1V, D1W, D1Y, and D1Z and supplies a regenerative current toward the transformer 8. The electric power converter 1 is shown in U.S. Pat. No. 5,608,301, the disclosure of which is hereby incorporated by reference. Moreover, the electric power converter 1 is also shown in U.S. Pat. No. 5,731,681, the disclosure of which is hereby incorporated by reference.

An output of the electric power converter 1 is supplied to a smoothing capacitor 4. The electric power converter 1 either charges the smoothing capacitor 4 from the output of the switch circuit 9 or discharges the smoothing capacitor 4 by supplying the regenerative current to the transformer 8 with switching elements 1V, 1W, 1X, 1Y, and 1Z respectively connected to the diodes D1U, D1V, D1W, D1X, D1Y, and D1Z in parallel. Each of the switching elements 1V, 1W, 1X, 1Y, and 1Z comprises a transistor, an iGBT, an FET, or a GTO. The output voltage of the smoothing capacitor 4 is detected by CV sensor 15. An output of the smoothing capacitor 4 is supplied to an inverter circuit 2 which generates drive phase signals supplied to a motor 5 such as an induction motor. A shaft of a rotor of the motor 5 is coupled to a centrifugal container 6.

A position sensor 33 detects a position and a rotating speed of a rotor of the motor 5 and generates a rotating speed signal 33a which also indicates the position of the rotor. The rotating speed signal is supplied to a timer unit ITU2 of a microprocessor 27. The microprocessor 27 is further supplied with a speed command signal 34 and controls the selector 31, an analog switch 16, a data pattern generator 20, a potentiometer 22, a power controller 26, and an inverter control circuit 11. The microprocessor 27 may be supplied with a start/stop signal instead the speed command signal 34. In this case, the speed command signal 34 is generated by the microprocessor 27 with reference to the rotating speed signal 33a to accelerate the motor 5 to a running speed when starting is commanded and decelerates the motor 5 to stop when stopping is commanded.

The selector 31 generates a drive signal supplied to a photo-coupler 32 to select either of the high secondary voltage or the low secondary voltage from the transformer 8.

The inverter control circuit 11 includes a PWM (pulse width modulation) circuit 28 and a PAM (pulse amplitude modulation) circuit 29, and a driver 30. The microprocessor 27 generates a frequency reference signal in accordance with the rotating speed signal 33a. The PWM circuit 28 and the PAM circuit 29 respectively generate PWM phase signal and PAM phase signals which are supplied to the gates of switching elements 2U, 2V, 2W, 2X, 2Y, and 2Z in the inverter circuit 2. Each of the switching elements 2U, 2V, 2W, 2X, 2Y, and 2Z comprises a transistor, an iGBT, an FET, or a GTO.

The power factor controlling circuit 10 controls the electric power converter 1 in accordance with the voltage of the smoothing capacitor 4, the current intensity from the current sensor 14, a voltage of the ac power detected by the voltage sensor 13, and a mode in corporate with the microprocessor 27.

The switch 9 includes triacs which are coupled to photo-couplers 32 which are responsive to the selector 31 to output the high secondary voltage or the low secondary voltage.

The power factor improving circuit 10 controls the voltage of the smooth capacitor 4 by controlling the electric power converter 1 with harmonic current component suppressed. On the other hand, the power factor improving circuit 10 tends to increase the rectified voltage, so that the switch 9 is provided to reduce the rectified voltage.

In the electric power converter 1, the gate of the switching elements 1V, 1W, 1Y, and 1Z are respectively coupled to photocouplers 24. The power factor improving IC in the power factor improving circuit 12 manufactured by Fuji Electric company of which model number FA5331 controls a data pattern generator 20 which successively supplies one of data patterns in response to an output of a polarity detector 23 which detects a polarity of the ac power. The data pattern from the data pattern generator 20 is supplied to the photocoupler 24 through a driver 21 to turn on and off the switching elements 1V, 1W, 1Y, and 1Z.

The power factor improving circuit 12 operates the electric power converter 1 in a forward operation condition, which acts as a voltage up converter, to charge the smoothing capacitor 4 to a predetermined voltage with a current including a low amount of harmonics, that is, of which waveform is analogous to that of the ac power 7 in corporation with the reactor 3 while the motor 5 is power-running. During regeneration, the power factor improving circuit 12 operates the electric power converter 1 in a backward operation condition, which acts as a voltage-down converter, to discharge the smoothing capacitor 4 to a predetermined voltage. For this operation, the voltage waveform of the ac power 7 is detected and supplied to the power factor improving circuit 12 by the V sensor 13 which may comprise an insulated transformer, a current waveform is detected and supplied to the power factor improving circuit 12 by the current sensor 14 which may comprise a Hall count sensor, and the voltage of the smoothing capacitor 4 is detected and supplied to the power factor improving circuit 12 by the CV sensor 15 which may comprise an insulated voltage signal transmitter such as analog photocoupler.

The current waveform is rectified by a rectifier 19B and an output of the rectifier 19B is supplied to one input of the analog switch 16 and supplied to another input of the analog switch 16 through an attenuator 18. The analog switch 16 outputs either of the waveform from the current sensor 14 or the attenuator 18 in accordance with the forward and backward operation to change the magnitude of the current waveform in order that the forward and backward operations are provided by the same function of the power factor improving circuit 12. The voltage of the smoothing capacitor 4 is supplied to the potentiometer 22 which divides the voltage of the smoothing capacitor 4 in accordance with the control signal from the microprocessor 27. The divided voltage is directly supplied to a third input of the analog switch 16 and is supplied to a differential amplifier 17 of which another input is supplied with a reference voltage to subtract the output of the potentiometer 22 from the reference voltage. The analog switch 16 outputs either of the divided voltage from the potentiometer 22 or an output of the differential amplifier 17.

As mentioned above, the selector 31 controls the switch 9 to select the high secondary voltage, the low secondary voltage of the transformer 8, or an off condition in response to the microprocessor 27. In this embodiment, triacs are used for the switch circuit 9. However, other switch elements can be used such as relays.

The potentiometer 22 comprises a digital potentiometer manufactured by Analog Devices of which model number is AD8402 which can control the voltage dividing ratio in accordance with the control signal from the microprocessor 27 and its output is supplied to the power factor improving circuit 12 through the analog switch 16.

The power factor improving circuit 12 controls the voltage of the smoothing capacitor 4 such that the voltage of the smoothing capacitor detected by the CV sensor 15 agrees with an internal reference voltage. That is, the microprocessor 27 can controls the voltage of the smoothing capacitor 4 within a predetermined range.

The pulse width modulation circuit 28 generates pulse (data) patterns in accordance with the speed signal 33$a$ and the speed command signal 34 in PWM mode. The pulse pattern are supplied to the inverter 2 through the driver 30 and the photocoupler 25 to turn on and off the switching elements 2U, 2V, 2W, 2X, 2Y, and 2Z.

The pulse amplitude control circuit 29 generates pulse amplitude modulation pulse patterns in accordance with the speed signal and the speed command signal 34 in PAM mode. The pulse pattern is supplied to the inverter 2 through the driver 30 and the photocoupler 25 to turn on and off the switching elements 2U, 2V, 2W, 2X, 2Y, and 2Z.

The power control circuit 26 controls supplying current to the drivers 21 and 30 to protect the motor control apparatus. That is, the power control circuit 26 protects the switching elements 1V, 1W, 1Y, and 1Z in the electric power converter 1 from over current, a short circuit between arms, or protects the smoothing capacitor 4 from over voltage of the smoothing capacitor 4. Moreover, the power control circuit 26 turns off the drivers 21 and 30 during the initial condition of the motor control apparatus and during switching the mode.

The position sensor 33 detects a position of the motor 5 to generate the rotor position signal which is supplied to a timer unit ITU2 included in the microprocessor 27. The microprocessor 27 detects the rotating speed of the motor 5 to generate the rotating speed signal by using a clock count function of the ITU2. The position signal from the position sensor 33 is used for phase switching timings.

In the motor control apparatus mentioned above, because isolation functions are provided in the V sensor 13, I sensor 14, the CV sensor 15, and photocouplers 24, 25, and 32, the reference potentials or the ground levels are insulated among the inverter 2, the electric power converter 1, the power factor improving control circuit 10, and the inverter control circuit 11. Accordingly, this prevents the power factor improving control circuit 10 and the inverter control circuit 11 from erroneous operations due to noise from the switching elements 2U, 2V, 2W, 2X, and 2Y in the electric power converter 1 and the inverter 2.

The operation will be further described with reference to FIGS. 2 to 13.

Figure 4:
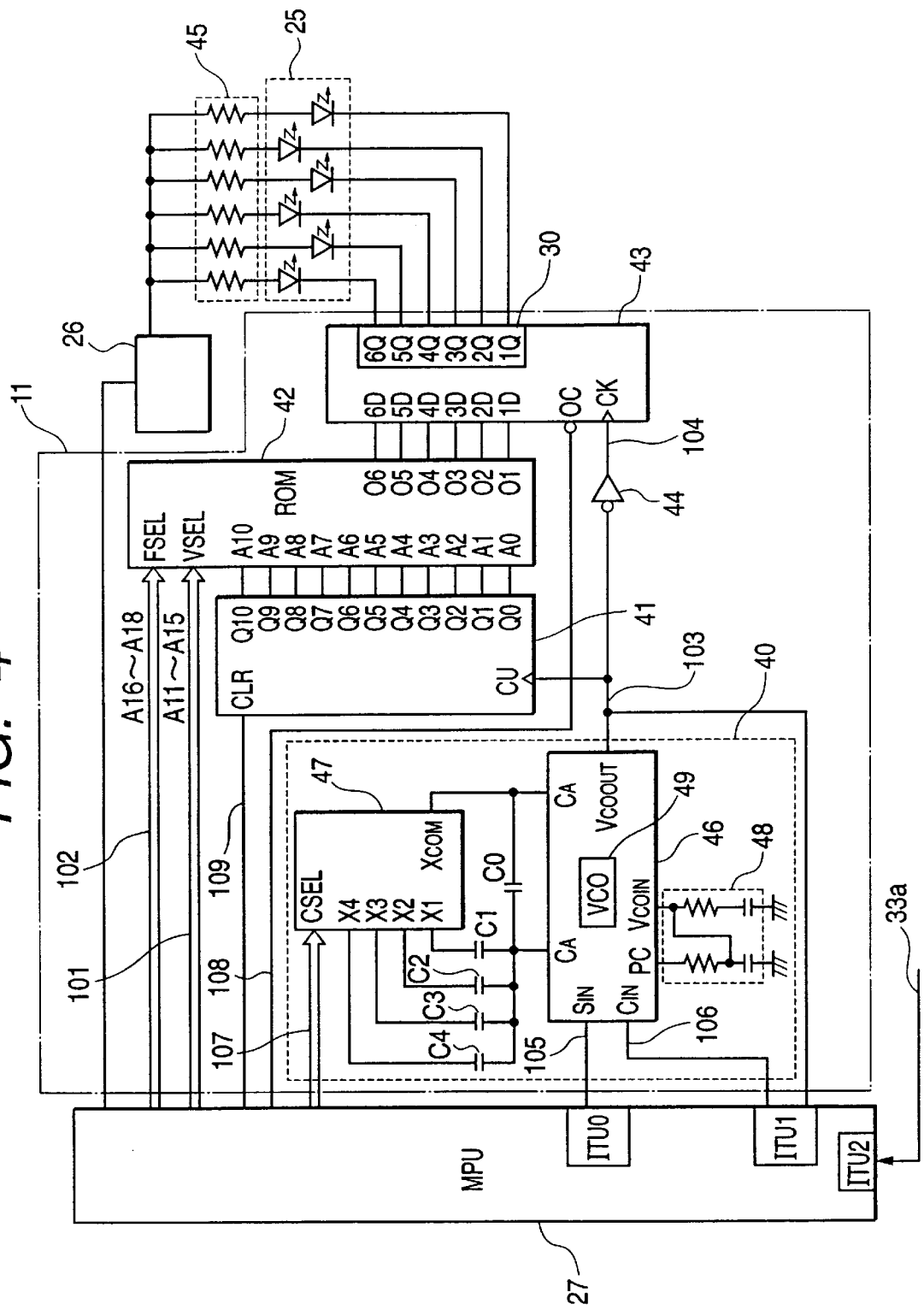
FIG. 4 is a block diagram of this embodiment showing the inverter control circuit 11 and the microprocessor 27 shown in FIG. 1.

FIG. 4 is a block diagram of this embodiment showing the inverter control circuit 11 and the microprocessor 27 shown in FIG. 1.

A ROM 42 stores pulse patterns representing turning on and off of the switching elements 2U, 2V, 2W, 2X, 2Y, and 2Z. Logic levels "1" or "0" in the ROM 42 are read in response to an output of a counter 41 supplied to the address lines A0 to A10 and outputted at outputs 01 to 06 of the ROM 42. A clock of the counter 41 is supplied from a PLL circuit 40 at an input CU thereof. A frequency of the clock signal 103 from the PLL circuit 40 is controlled by timer units ITU0 and ITU1 included in the microprocessor 27. A data latch 43 including a gate driver 30 synchronizes their outputs with the clock signal 103, more specifically, an output 104 of the inverter 44. The driver 30 supplies the outputs of the latch 43 to the photocouplers 25. The photocouplers 25 control turning on and off of the switching elements 2U, 2V, 2W, 2X, 2Y, and 2Z in the inverter 2.

Figure 7:
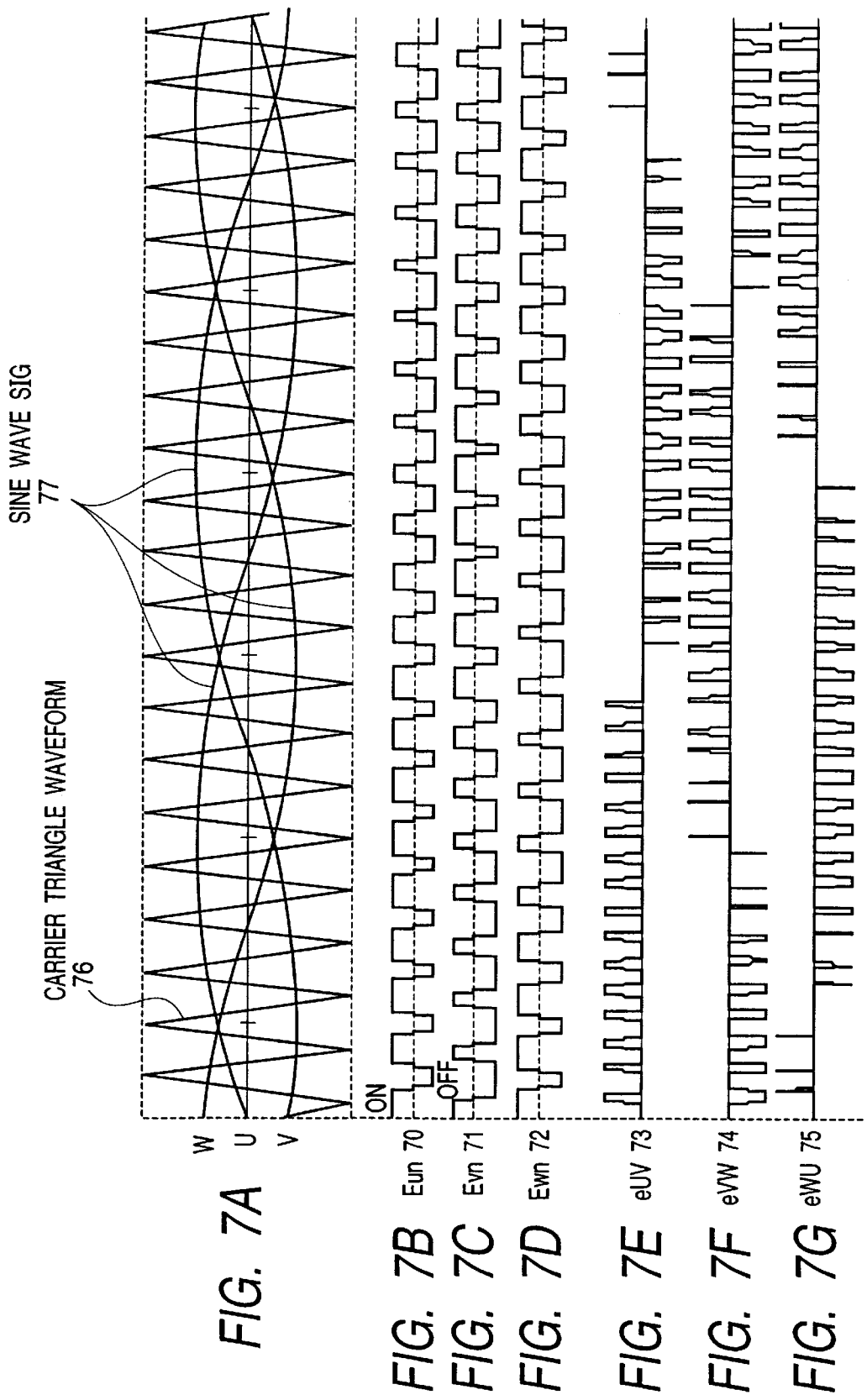
FIG. 7A is a graphical drawing of this embodiment showing a carrier triangle waveform and sine wave phase signals.
FIGS. 7B to 7G are graphical drawing of this embodiment illustrating switching patterns of the inverter shown in FIG. 1.
Figure 8:
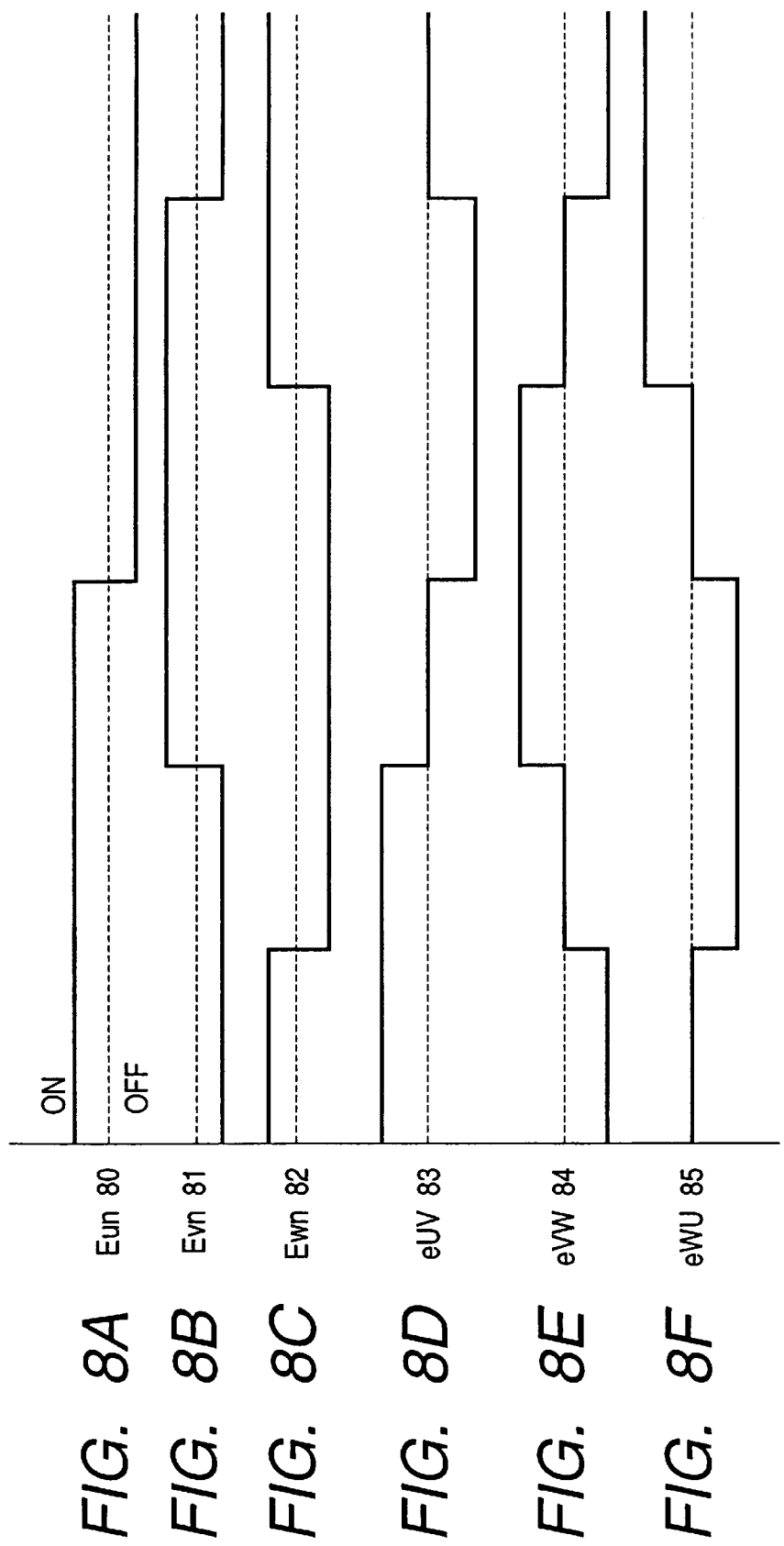
FIGS. 8A to 8F are graphical drawings of this embodiment showing waveforms of the pulse amplitude modulation.

FIG. 7A is a graphical drawing of this embodiment showing a carrier triangle waveform and sine wave phase signals. FIGS. 7B to 7G are graphical drawing of this embodiment illustrating switching patterns of the inverter 2. The pulse patterns are previously obtained and stored in the ROM 42 as follows:

The pulse widths are obtained by comparing a carrier triangle waveform 76 with sine wave signals 77 of U, V, and W phases. Waveforms Eun 70 to Ewn 72 in FIGS. 7B to 7D respectively show ON periods of the switching elements 2U, 2V, 2W and respectively show OFF periods of the switching elements 2X, 2Y, and 2Z. In FIGS. 7E to 7G, waveforms eUV 73, eVW 74, and eWU 75 represent voltage waveforms u-v phase, v-w phase, and w-v phase of the motor 5. The example in FIG. 7 shows the case of duty 50% of the carrier. If the modulation ratio, that is, the duty should be varied, an amplitude of the sine wave signals 77. If the number of the pulses in one period of the sine wave signals should be varied, the number of cycles in the one period of the sine wave signals 77 is changed.

FIGS. 8A to 8F are graphical drawings of this embodiment showing waveforms of the pulse amplitude modulation. In the PAM mode, the switching elements 2U, 2V, 2W, 2X, 2Y, and 2Z of the inverter 2 are controlled as shown in FIGS. 8A to 8F and the data patterns are stored in the ROM 42 and are successively read in accordance with the clock signal 41, that is, the position of the rotor. waveforms Eun 80, Evn 81, and Ewn 82 respectively represent ON periods of the switching element 2U, 2V, and 2W which are correspondingly OFF periods of the switching elements 2X, 2Y, and 2Z and have 120° phase different with each other and duration of 180°. Each of waveforms eUV 83, eVW 84, and eWU 85 shown in FIGS. 8D to 8F represent forward current ON period of 120° and backward current ON period phase-displaced by 180° from the forward current On period and waveforms eUV 83, eVW 84, and eWU 85 are phase displaced by 120°.

Figure 6:
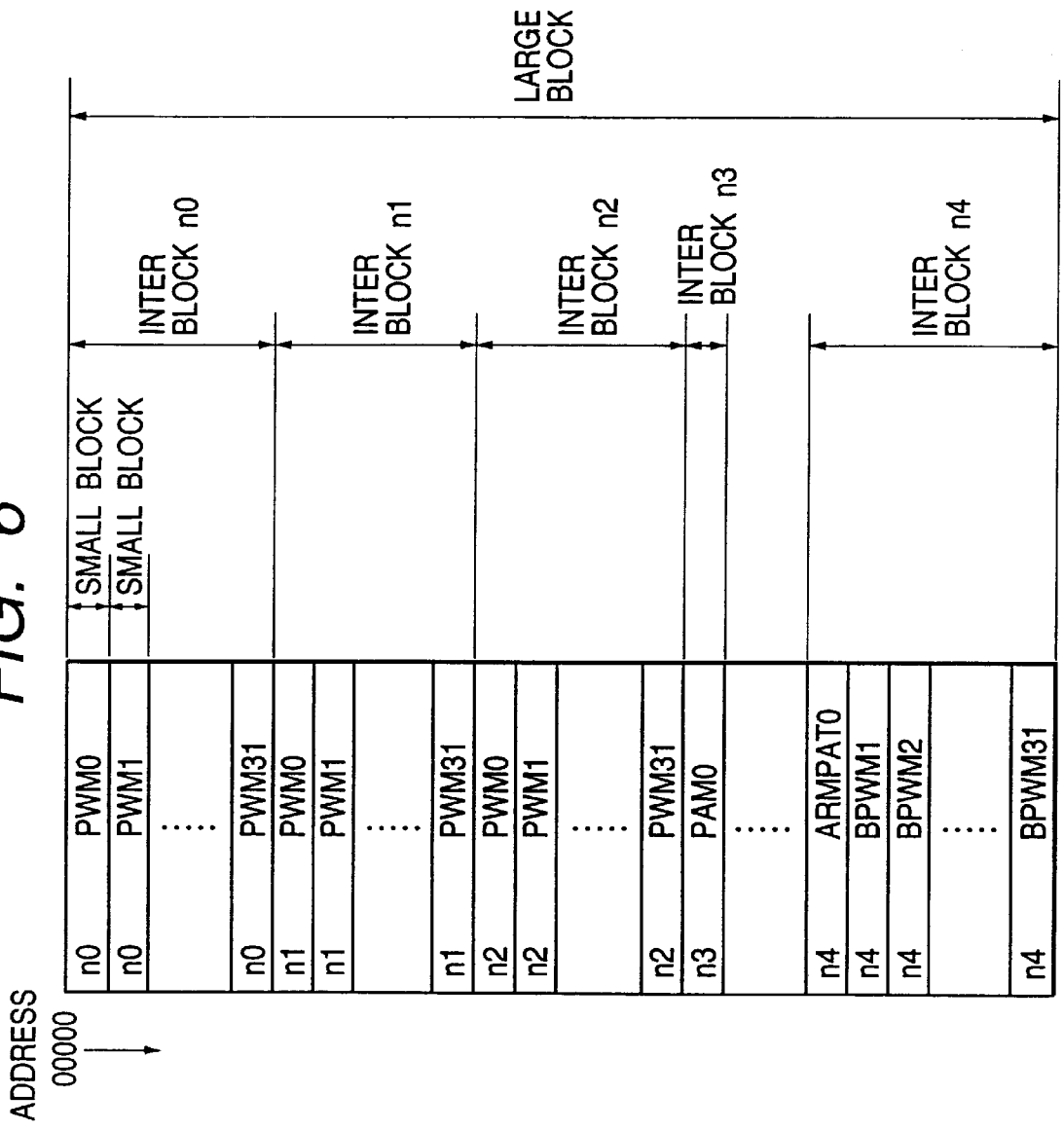
FIG. 6 is a table of this embodiment showing the contents of the ROM shown in FIG. 4.

FIG. 6 is a table of this embodiment showing the data blocks of the ROM 42 shown in FIG. 4.

A large block includes intermediate blocks n0 to n2 for pulse width modulation and intermediate block n3 for pulse amplitude modulation, and an intermediate block n4 for another pulse width modulation.

The data pattern in each of the intermediate blocks n0 to n2 is for power control of thirty-two steps, wherein data patterns n0 PWM0 (n1 PWM0) show the minimum duty and data patterns n0 PWM 31 (n4PWM 31) show the maximum duty. The different between the intermediate blocks n0 and n1 is in the number of cycles of the triangle carrier wave 76. This is because a switching frequency of the switching elements 2U, 2V, 2W, 2X, 2Y, and 2Z increases with increase in the rotating speed of the motor 5, so that a temperature of the switching elements 2U, 2V, 2W, 2X, 2Y, and 2Z increases due to switching loss. Accordingly to suppress increase in the temperature of the switching elements 2U, 2V, 2W, 2X, 2Y, and 2Z, the number of cycles of the triangle carrier 76 in the intermediate block n1 is smaller than that in the intermediate block n0. Then, the data patterns in the intermediate block n0 is changed to the data patterns in the intermediate block n1 when the rotating speed of the motor 5 increases higher than a first reference rotating speed.

Moreover, the number of the cycles of the triangle wave in data patterns in the intermediate block n2 is further reduced in order that the data pattern is used further high rotation speed.

Each of small blocks, for example, n0 PWM0, stores data patterns which are successively read in response to the clock signal 103 every one cycle of the phase of U, for example, as shown in FIG. 7A.

Data patterns in the intermediate block n3 is used for pulse amplitude modulation, wherein the number of switching per once rotation is extremely smaller than the pulse width modulation as shown in FIGS. 7A to 7G and FIGS. 8A to 8F wherein the time base in FIG. 7A agrees with that in FIGS. 8A to 8F.

Change of reading the small blocks no PWM0 to n4 BPWM31 is effected by controlling the address A11 to A15 in control lines 101 which are connected to input FSEL of the ROM 42 and change of reading intermediate blocks n0 to n4 are effected by controlling the address A16 to A18 in the control lines 102 which are connected to input VSEL of the ROM 42. Therefore, switching between the pulse width modulation and the pulse amplitude modulation can be performed by controlling the controlling lines 101 and 102 by the microprocessor 27, so that the inverter control circuit 11 includes the pulse width modulation circuit 28 and the pulse amplitude modulation circuit 29 as shown in FIG. 1. Accordingly, the inverter 2 is operated in the pulse width modulation mode and the pulse amplitude modulation mode.

The operation of the inverter control circuit 11 will be further described. In FIG. 4, the data stored in the ROM 42 is supplied to the latch 43 with the driver 30 which comprises a data latch of which model number 74HC 374 for example. The latch 43 latches the data from the ROM 42 in response to a clock signal 104 which is derived from the clock signal 103 by the logic inverter 44 and the data is supplied to the photocouplers 25 by the driver 30 to turn on and off the switching elements 2U, 2V, 2W, 2X, 2Y, and 2Z.

The outputs 01 to 06 of the ROM 42 corresponds to the outputs 1Q to 6Q of the driver 30 which further corresponds to the switching elements 2U, 2V, 2W, 2X, 2Y, and 2Z. Then, for example, if the output 01 of the ROM 42 becomes "0", the level of the output 1Q of the driver becomes "0", so that an LED of the photocoupler 45 connected to the output 1Q is turned on, so that the switching element 2U turns on. An OC terminal of the latch circuit 43 controls the outputs of the driver 30 in the high impedance when a level of the control line 108 of the microprocessor 27 is "1".

The address data supplied to address inputs A0 to A10 of the ROM 42 is generated by the counter 41 which comprises cascaded three counters of which model number are 74 HC 193 for example. The counter 41 counts the clock signal 103 in response to a reading edge of the clock signal 103 from the PLL circuit 40 and outputs the count value at the outputs Q0 to Q10. In response this, the ROM 42 outputs the data pattern at the outputs 01 to 06. The data patterns of 2048 are stored in the ROM 42 for one rotation of the motor 5, so that eleven address lines are used. The latch 43 is provided for preventing the timing deviation in the read data pattern which may cause a short circuit in the switching elements 2U, 2V, 2W, 2X, 2Y, and 2Z. That is, the short circuit means that the switching element 2U, for example, and switching element 2X turn of at the same time due to the timing deviation between data in the read data pattern.

The terminal CLR of the counter 41 is for clearing the count of the counter 41, wherein clearing is effected by the H of the control line 109 from the microprocessor 27.

The clock signal 103 is outputted by phase-locked loop IC 46 included in the PLL circuit 40 such as 74 HC 4046 at their VC0out. The input $S_{IN}$ of the PLL IC 46 is supplied with the frequency reference signal 105 which is generated by dividing the internal clock for the microprocessor 27 by the timer module ITU0 of the microprocessor 27. The clock signal 103 which is the output of the PLL IC 46 is supplied to the timer module ITU1 which frequency-divides the clock signal 103 and outputs to be compared signal 106 supplied to the input $C_{IN}$ of the PLL IC 46. The PLL IC 46 compares the phase of to be compared signal 106 with the phases of frequency reference signal 105 and outputs a phase error at an output PC, which is supplied to a lowpass filter 48 including resistors and capacitors. The low pass filter 48 generates a bias voltage which is supplied to an input $V_{COIN}$ of the PLL IC 46 to control the oscillation frequency of which frequency is determined by multiplying the frequency of the frequency reference signal 105 by the dividing number of the timer module ITU1. The oscillation frequency of the VCO 49 is required to cover an oscillation frequency range of 10 kHz to 6.9 MHz because the motor 5 is required to rotate 0 to 200 krpm in the case that the motor is used for rotating the high speed centrifugal apparatus. Then, the capacity coupled to the PLL IC 46 through inputs $C_A$ is switched by an analog multiplexer 47. That is, the microprocessor 27 controls the analog multiplexer 47 to select one of capacitors C1 to C4 having different capacitances. A capacitor C0 determines the maximum oscillation frequency or the maximum rotating speed of the motor 5.

FIG. 2 is a graphical drawing of this embodiment showing mode change. FIG. 3 is a table of this embodiment showing the control condition with respect to the mode of the motor control apparatus. The mode of the motor control apparatus changes with the rotating speed of the motor 5 as shown in FIG. 2.

Figure 11:
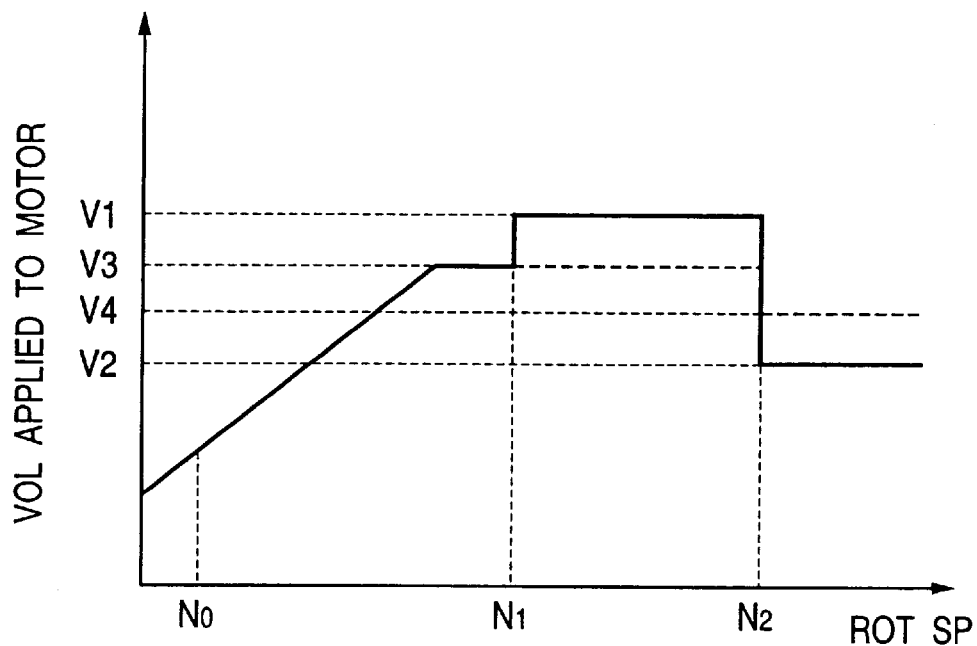
FIG. 11 is a graphical drawing of this embodiment showing a voltage applied to the motor shown in FIG. 1.
Figure 12:
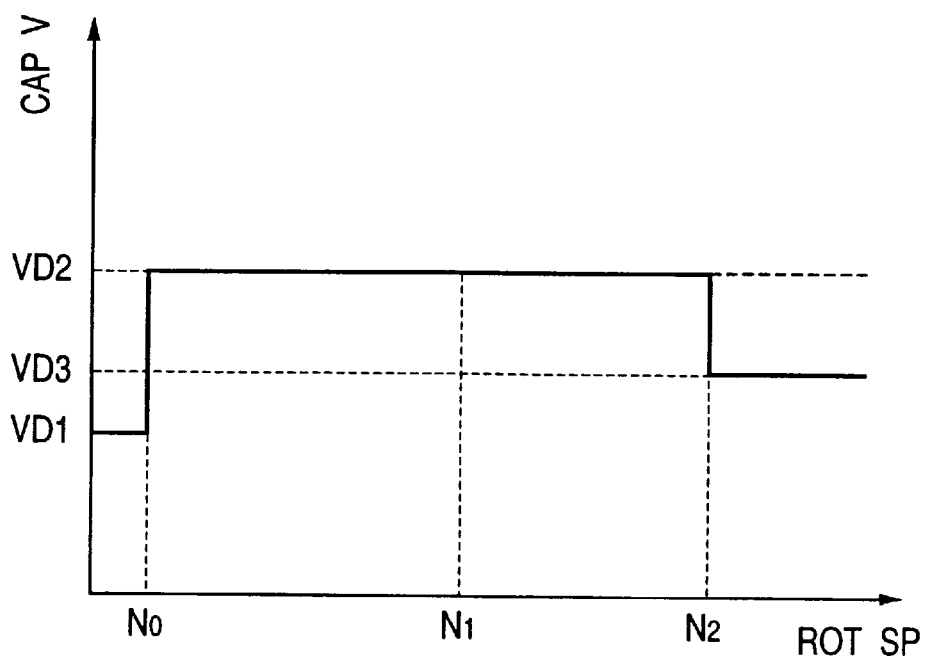
FIG. 12 is a graphical drawing of this embodiment showing variation in the voltage of the smoothing capacitor shown in FIG. 1.

In the mode I, the rotor of the motor 5 is rotated at a slow acceleration from the stop condition and the control condition is that the switch 9 is controlled to output the low secondary voltage and the modulation is effected by pulse width modulation. The low secondary voltage is selected because the power to the motor 5 should be reduced to provide smooth slow acceleration. The inverter control circuit 11 controls the pulse width to provide V/f control for the motor 5. FIG. 11 is a graphical drawing of this embodiment showing a voltage applied to the motor 5. FIG. 12 is a graphical drawing of this embodiment showing variation in the voltage of the smoothing capacitor 4. The voltage of the smoothing capacitor 4 is controlled to a low voltage VD1 when the rotating speed is less than N0, i.e., in the mode I. On the other hand, the voltage applied to the motor 5 increases with increase in the rotating speed of the motor 5. The frequency control is provided by the PLL circuit 40 under control by the microprocessor 27 to provide a suitable slip frequency to the motor 5, so that the rotor is gradually accelerated along the curve shown in FIG. 2.

The control of the actual rotating speed toward the rotating command speed signal which is gradually increased is determined by the difference between the present rotating speed and the rotating command speed signal of which increase rate is predetermined through PID operation or the like. Moreover, the slip frequency and the duty in the pulse width modulation are obtained from the difference to provide V/f control for feedback control which is well known.

In the mode II, a large power is necessary for the motor 5 to rapidly accelerate the motor 5 toward the target constant rotating speed N2, so that the switch 9 is switched to output a high secondary voltage to suppress increase in current passing through the reactor 3. Then, the electric power converter 1 acts as the voltage up converter as similar to the mode I and the smoothing capacitor 4 is charged to a high constant voltage VD3. Accordingly, the V/f control in the mode II is that the duty of the pulse modulation is changed stepwise by changing the small data blocks in the ROM 42 to be read. Moreover, with increase in the rotating speed, the data patterns to be read are changed from the intermediate block n0 to n1 and n2 to reduce the number of cycles of the triangle carrier 76 to suppress the switching frequency of the switching elements 2U, 2V, 2W, 2X, 2Y, and 2Z. The v/f control, that is, the control of rotating speed is obtained by successively decreasing the dividing number of the timer unit ITU1 and further, the capacitors C1 to C5 are selected to provide a suitable oscillation frequency to provide a plus slip frequency to accelerate the motor 5 toward N1.

Figure 9:
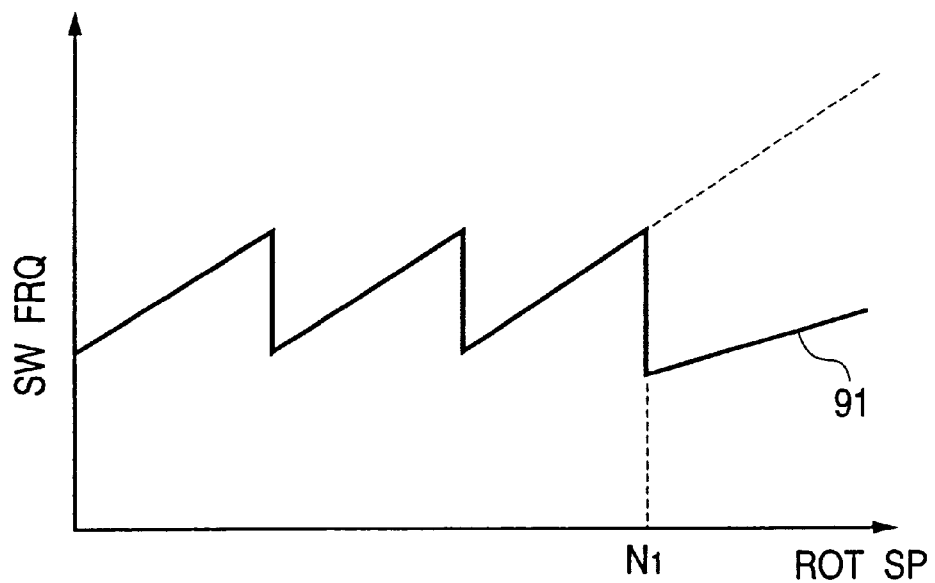
FIG. 9 is a graphical drawing of this embodiment showing switching frequency of the switching elements shown in FIG. 1 with respect to the rotating speed.
Figure 10:
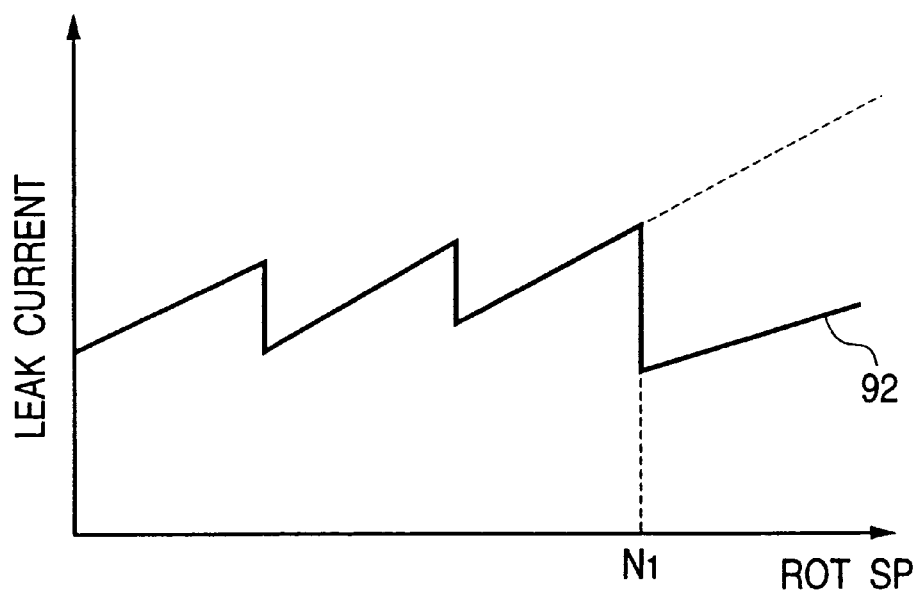
FIG. 10 is a graphical drawing of this embodiment showing variation of leak current with respect to the rotating speed.

If the motor 5 is accelerated by the pulse width modulation over a rotating speed N1, the voltage of the smoothing capacitor 4 is high and the switching frequency of the switching elements 2U, 2V, 2W, 2X, 2Y, and 2Z becomes high, so that leakage currents to the ground through a stray capacitance of the motor 5 will increase. Then, in the mode III, to suppress the leak current, at the high rotation speed, controlling the motor 5 is changed to the pulse amplitude modulation. The data patterns are read from the intermediate block n3 to provide the pulse amplitude modulation. FIG. 9 is a graphical drawing of this embodiment showing switching frequency of the switching elements 2U, 2V, 2W, 2X, 2Y, and 2Z with respect to the rotating speed and FIG. 10 is a graphical drawing of this embodiment showing variation of leak current with respect to the rotating speed. In FIGS. 9, and 10, the switching frequency increases as shown by the change line if the pulse width modulation is continued more than the rotating speed N1. However, in fact the modulation is changed to the pulse amplitude modulation, so that the switching frequency increases as shown by solid line 91. Similarly, the leak current is reduced after the rotating speed N1 as shown by a solid line 92 in FIG. 10.

As mentioned, the mode I is effected when the rotating speed signal 33a is less than N0 and the rotating speed 33a and the rotating speed command signal 34 indicate acceleration. The mode II is effected when the rotating speed signal 33a is not less than N0 and less than N1 which is greater than the N0 and the rotating speed signal 33a and the rotating speed command signal 34 indicate acceleration. The mode III is effected when the rotating speed signal 33a is not less than N1 and less than N2 which is greater than the N1 and the rotating speed signal 33a and the rotating speed command signal 34 indicate acceleration. The mode IV is effected when the rotating speed signal 33a is substantially equal to N2 and the rotating speed signal 33a and the rotating speed command signal 34 indicate a constant rotating speed. The mode V is effected when the rotating speed signal 33a is equal to or less than N2 and not less than N1 and the rotating speed signal 33a and the rotating speed command signal 34 indicates deceleration. The mode VI is effected when the rotating speed signal 33a is less than N0 and the rotating speed command signal 34 indicates deceleration.

Figure 5:
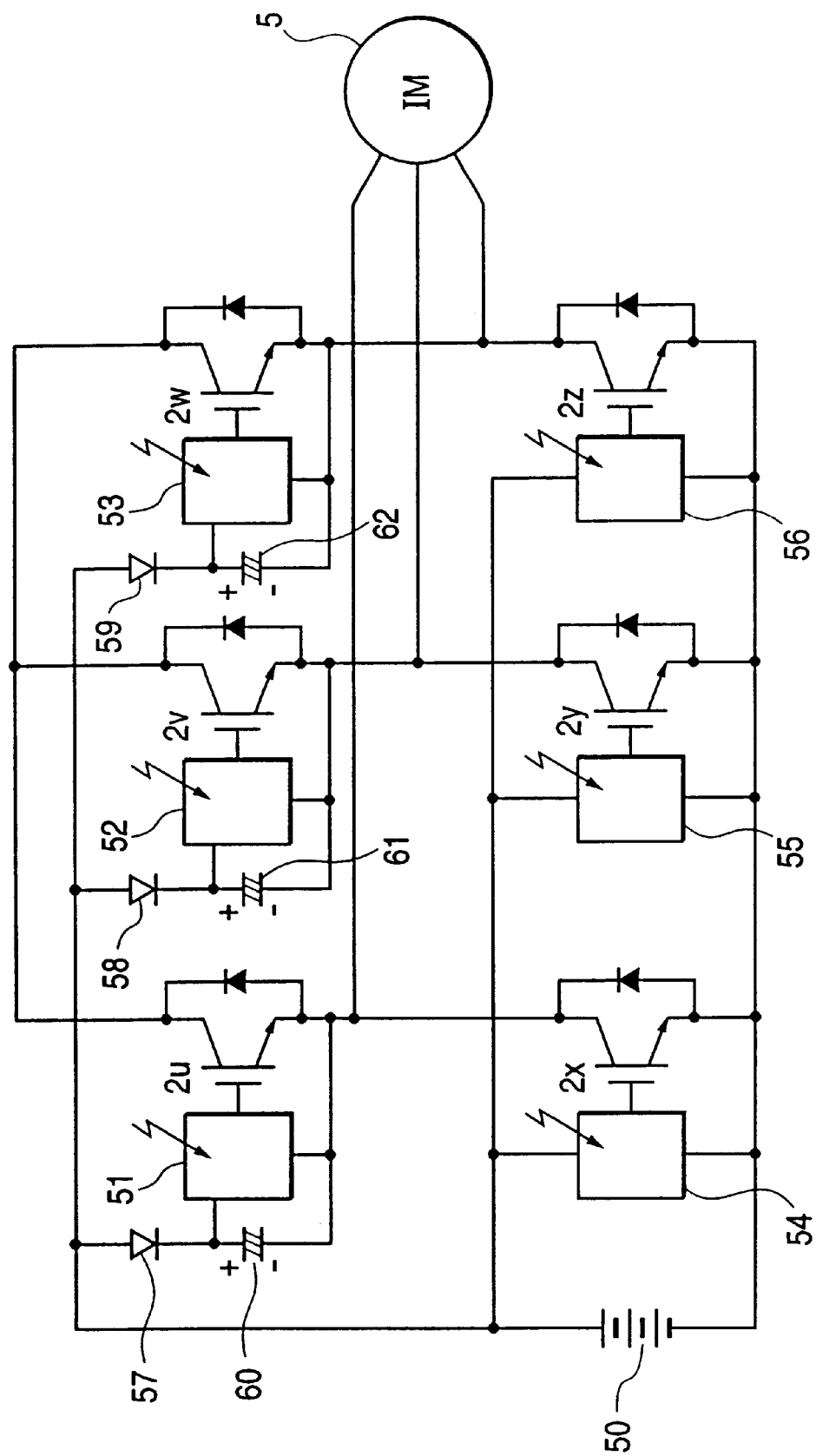
FIG. 5 is a block diagram of this embodiment showing structure of the inverter circuit shown in FIG. 1.

FIG. 5 is a block diagram of this embodiment showing a structure of the inverter circuit 2. Photoreceiving elements 51 to 53 for receiving light signals from the photocouplers 25 have voltage source circuits including a diode 57, an electrolyte capacitor 60 connected to the diode 57 in series forming a charge pump circuit. When the switching element 2X turn on, the electrolyte capacitor 60 is charged through the diode 57. When the switching element 2X is turned off, the potential of the negative polarity of the electrolyte capacitor 60 becomes a floating condition and is different from the command voltage source 50. The charge in the electrolyte capacitor 60 is used to drive the switching element 2U when the photoreceiving element in the driver 51 receives the light signal from the photocoupler 25.

The switching elements 2V and 2W also have the charge pump circuits as shown in FIG. 5. The capacitor of the electrolyte capacitor is sufficiently large to prevent erroneous operation due to pulsation in the charged voltage in the electrolyte capacitor 60.

If the voltage sources for controlling the switching elements 2U, 2V, 2W are provided with an insulated type constant voltage circuit such as a DC-DC converter and if the pulse amplitude modulation is effected at the low rotating speed less than N1, it is possible to reduce the leak current at the lower rotation speed.

In FIG. 11, the chain lines represents the voltage applied to the motor 5 if the motor 5 is driven by pulse width modulation after rotating speed N1. On the other hand, the solid line after rotating speed N1 represents the voltage applied to the motor 5 by the actual pulse amplitude modulation. As shown in FIG. 11, the voltage V1 applied to the motor in pulses amplitude modulation is higher than the voltage V3 by the pulse width modulation because a ratio of utilizing the charged voltage in the smoothing capacitor 4 by the pulse amplitude modulation is higher than that by the pulse width modulation. Accordingly, it is possible to shorten the acceleration interval by increase in the input power to the motor 5 at the high speed rotating region such as the mode III.

In the mode IV in FIG. 2, the rotating speed of the motor 5 is maintained at the target rotating speed N2. The motor 5 does not require an acceleration torque. However, a temperature rise is high due to a mechanical loss in the ball bearing. Then, to prevent excess generation of heat in the motor 5, the input power to the motor 5 should be reduced by decreasing a peak voltage applied to the motor 5. Then, the switch 9 selects the lower secondary power. Moreover, harmonic components in the drive current to the motor 5 are suppressed by the pulse amplitude modulation to reduce generation of a heat in the motor 5, so that a temperature at the ball bearings are suppressed.

In the mode IV, the microprocessor 27 controls the potentiometer 22 to reduce the voltage of the smoothing capacitor 4 from VD2 to VD3 as shown in FIG. 12, so that the voltage applied to the motor 5 is decreased from V4 to V2 as shown in FIG. 11. In this mode, speed control of the motor 5 to the target rotating speed N2 is provided with constant voltage slip control as follows:

The microprocessor 27 obtains a difference between the present rotating speed of the motor 5 and the target rotating speed N2 by the PID operation, determines a slip frequency from the result, and supplies a corresponding dividing number to the timer module ITU1.

Moreover, it is also possible to control the voltage of the smoothing capacitor 4 by controlling the dividing ratio of the potentiometer 22 in accordance with the difference between the present rotating speed of the motor 5 and the target rotating speed N2 with slip fixed.

The mode V is for rapidly decelerating the motor 5 by the regenerative braking operation. The inverter 2 regenerates an electric energy from the mechanical energy in the motor 5 by the V/f control by a negative slip frequency control and the phase width modulation control to charge the mooting capacitor 4 to brake the rotor of the motor 5. The electric power converter 1 discharges the smoothing capacitor 4 to maintain a constant voltage by supplying the discharge current toward the transformer 8 to provide a waveform which is analogous to that of the ac power supply 7. That is, the electric power converter 1 operates as a voltage down converter.

The mode VI is for slowly decelerating the motor 5 after rapidly deceleration by the mode V to stop the motor 5. In this condition, the rotation speed of the rotor 5 is low, so that the motor 5 should be decelerated by the dc current braking instead the regenerative braking. The microprocessor 27 controls the switch 9 to supply the low secondary voltage to the electric power converter 1. The electric power converter 1 acts as a voltage up converter to control the voltage of the smoothing capacitor 4 at a low voltage. The modulation circuit 29 operates the inverter 2 by the pulse width modulation to control the voltage applied to the motor 5. The microprocessor 27 supplies the address data to the ROM 42 to read the data patterns stored in small bocks n4 BPWM1 to n4 BPWM31 for braking in the intermediate block n4. The duty changes every small blocks, so that there are thirty-one steps of pulse width modulation. The small bock n4 ARMPAT0 is data pattern for providing the smallest power braking. That is, the switching elements 2X, 2Y, and 2Z are repeatedly turned on and off with the switching elements 2U, 2V, and 2W turned off. Therefore, power is not supplied to the motor 5 but the motor 5 is braked by switching elements 2X, 2Y, and 2Z.

Figure 13:
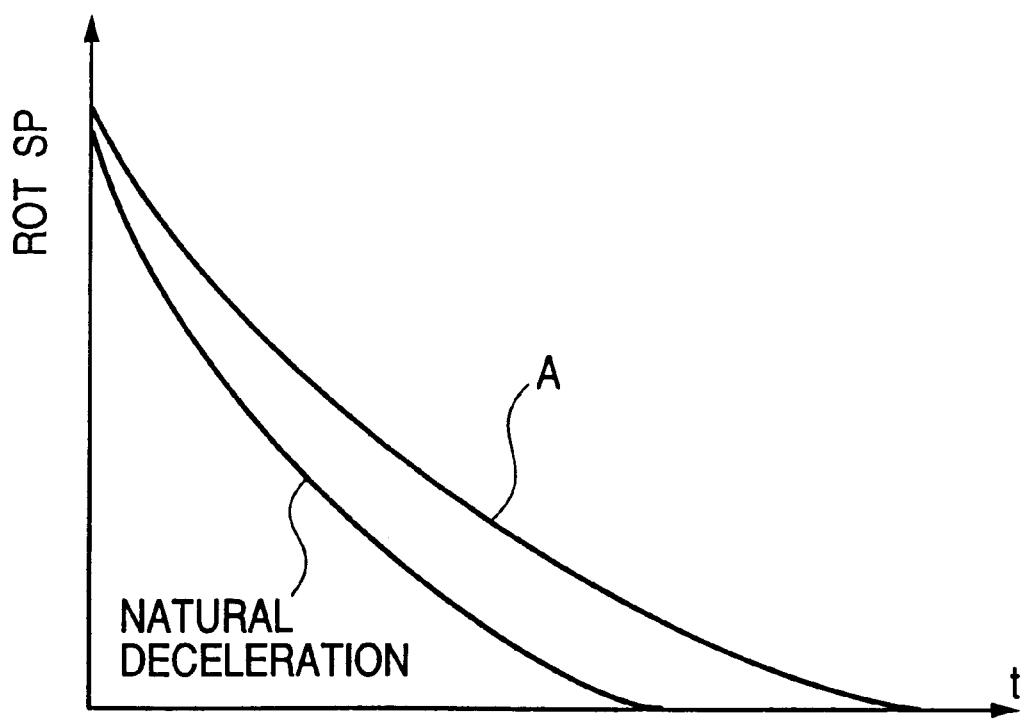
FIG. 13 is a graphical drawing of this embodiment showing deceleration of the motor shown in FIG. 1.

FIG. 13 is a graphical drawing of this embodiment showing deceleration of the motor 5. In the mode IV, there may be the case that the motor 5 is decelerated more moderately as shown by curve A than that by the natural braking. In this case, the microprocessor 27 operates the electric power converter 1 in the forward operation as similar to the mode I and operates the switch 9 to supply the low secondary voltage to the electric power converter 1 which controls the voltage of the smoothing capacitor 4 at a low voltage to drive the motor 5 to provide an extremely low deceleration.

Figure 14:
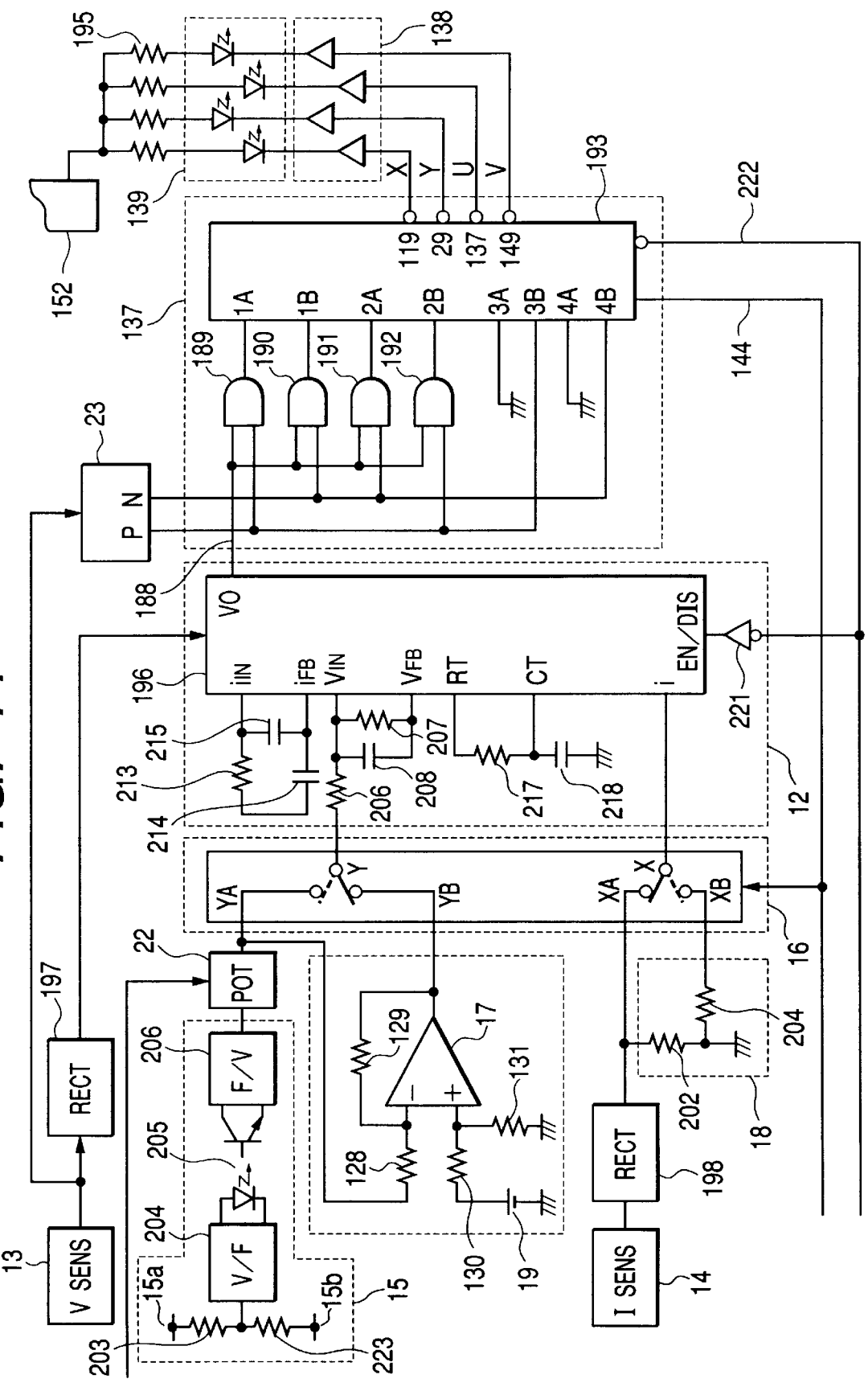
FIG. 14 is a block diagram of this embodiment showing the structure of the power factor improving control circuit shown in FIG. 1.
Figure 15:
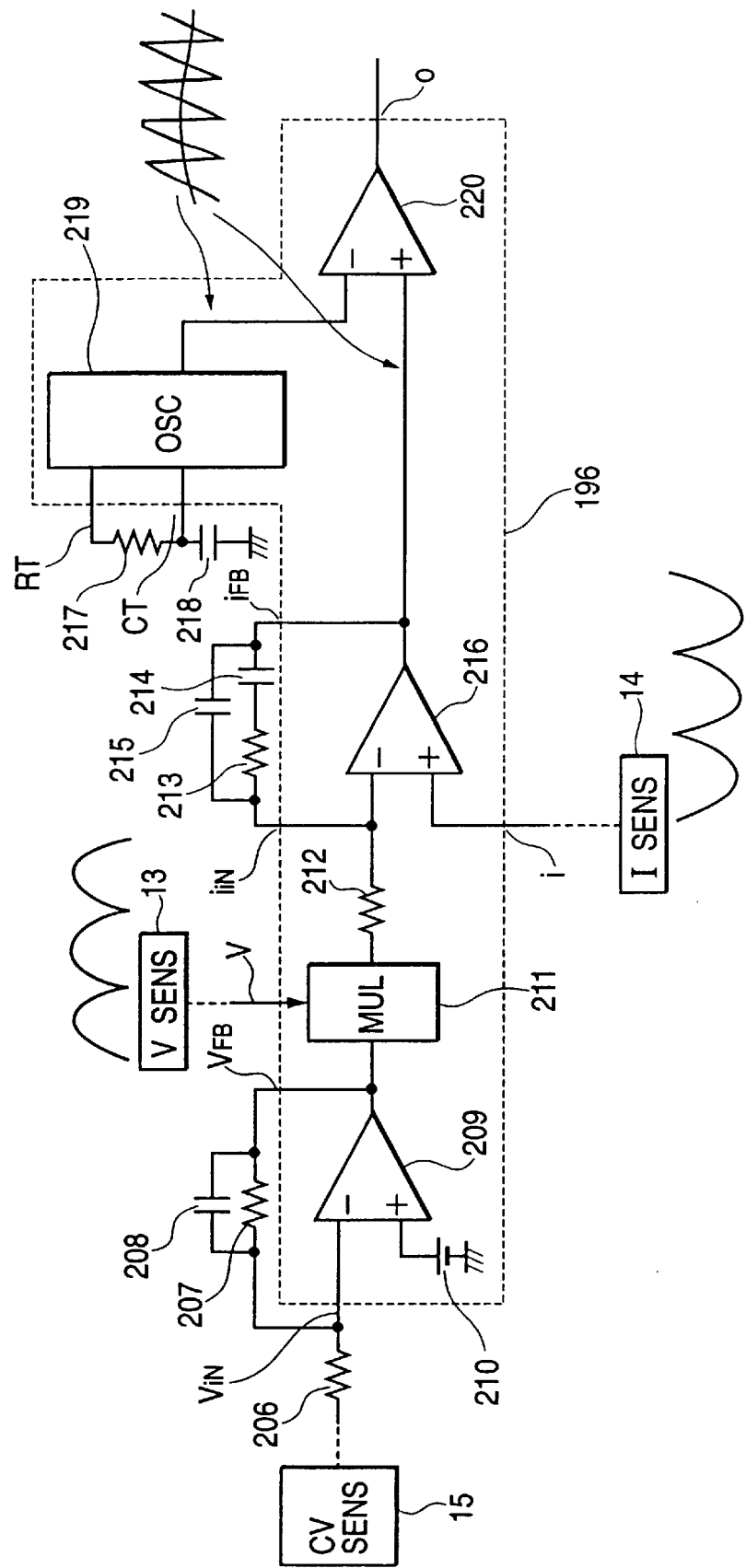
FIG. 15 is a functional block diagram of an power factor improving circuit shown in FIG. 14.

FIG. 14 is a block diagram of this embodiment showing the structure of the power factor improving control circuit 10. FIG. 15 is a functional block diagram of an power factor improving circuit shown in FIG. 14.

The output of the V sensor 13 is rectified by a rectifier 197 and the full-wave rectified output is supplied to a V input of the power factor improving IC 196 and supplied to a polarity detector 23. On the other hand, an output of the I sensor 14 is rectified by a rectifier 198 and directly supplied to an XA input of the analog switch 12 and supplied to an XB input through the attenuator 18. Either of the signal from the XA input or the XB input is supplied to i input of the power factor improving IC 196 through an output X. The voltage of the smoothing capacitor 4 is detected by the CV sensor 15 of which both input terminals 15a and 15b are connected to terminals of the smoothing capacitor 4 and an output of the CV sensor 15 is supplied to the potentiometer 22 of which dividing ratio is controlled by the microprocessor 27. The output of the potentiometer 22 is supplied to Vin of the power factor improving IC 196 through a resistor 206 when the control signal 194 is "0".

The CV sensor 15 includes a V/F converter 204 for converting the voltage of the smoothing capacitor 4 to a frequency signal and a photocoupler 205 for transmitting an optical signal and receives the optical signal, and an F/V 206 for converting the received optical signal of the photocoupler 205 to the voltage signal supplied to the potentiometer 22.

As shown in FIG. 15, an amplifier 209 of the power factor improving IC compares and amplifies the output of the Y terminal of the analog switch IC 16, that is, the output of the potentiometer 22, with a reference voltage 210 using an input resistor 206, a feedback resistor 207, and a filter capacitor 208. An output of the operational amplifier 209 is supplied to a multiplier 211 which multiplies the output of the operational amplifier 209 with the signal from the V sensor 13, that is, the error signal VFB (the output of the operational amplifier 209). The following operational amplifier 216 obtains the difference between the output of the multiplier 211 and the signal from the I sensor 14. The difference is compared with a triangle waveform oscillation signal from an oscillator 219 by an operational amplifier 220. Accordingly, a pulse width modulation signal is generated in accordance with the difference. Then, if the polarity of the ac power 1 is positive, the switching element 1Y is turned on and off, so that the voltage-up converter including the reactor 3 and the smoothing capacitor 4 is formed. Accordingly, the voltage of the smoothing capacitor 4 is maintained at a constant voltage irrespective of the load, i.e., the motor 5. Moreover, the output of the electric power converter 1 includes almost no harmonic component.

In FIG. 14, the analog switch 16 is switched between the power running condition and the regenerative condition. Moreover, a control line 222 enables the power factor improving IC 196 through a logic inverter 221 and the ROM 193.

What is claimed is:

1. A motor control apparatus for a centrifugal apparatus comprising:
    an ac power source;
    a transformer for converting a voltage of said ac power source;
    an electric power converter connected to said transformer;
    a smoothing capacitor;
    power factor improving control means for controlling said electric power converter and adjusting a charge voltage of said smoothing capacitor;
    an inverter converter for a motor connected to said smoothing capacitor;
    switching means provided between a plurality of secondary voltage taps provided to said transformer and said electric power converter for switching among a plurality of secondary voltage taps; and
    inverter control means for controlling said inverter converter for said motor and switching between the pulse width modulation controlling and the pulse amplitude modulation.

2. A motor control apparatus as claimed in claim 1, further comprising a central processing unit for controlling said power factor improving control means and said inverter controlling means, said central processing unit being supplied with a rotation signal of said motor for controlling said inverter converter for said motor by said pulse width modulation controlling and said pulse amplitude controlling.

3. A motor control apparatus as claimed in claim 1, wherein said switching between the pulse width modulation controlling and the pulse amplitude modulation is effected by selecting a plurality of patterns stored.

4. A motor control apparatus as claimed in claim 1, wherein, when said motor is started up, said selection switch selects a low voltage of said secondary tap, said power factor improving control means adjusts a voltage of a dc voltage voltage-up-converted by said electric power converter to a constant low voltage, and said inverter control means includes said selection switch for selecting the pulse width modulation controlling to pulse-width-modulation-control said inverter converter for said motor and control means for controlling said power improving control means and said inverter control means.

5. A motor control apparatus as claimed in claim 1, wherein, when said motor is accelerated, said selection switch selects a high voltage of said secondary tap, said power factor improving control means adjusts a voltage of a dc voltage voltage-up-converted by said electric power converter to a constant high voltage, and said inverter control means includes said selection switch for selecting the pulse width modulation controlling to pulse-width-modulation-control said inverter converter for said motor and control means for controlling said power improving control means and said inverter control means.

6. A motor control apparatus as claimed in claim 1, wherein, when said motor is accelerated at a high speed rotating speed range, said selection switch selects a high voltage of said secondary tap, said power factor improving control means adjusts a voltage of a dc voltage voltage-up-converted by said electric power converter to a constant high voltage, and said inverter control means includes said selection switch for selecting the pulse amplitude modulation controlling to pulse-amplitude-modulation-control said inverter converter for said motor and control means for controlling said power improving control means and said inverter control means.

7. A motor control apparatus as claimed in claim 1, wherein, when said motor is at a high speed rotating speed within a high speed rotating speed range, said selection switch selects a low voltage of said secondary tap, said power factor improving control means adjusts a voltage of a dc voltage voltage-up-converted by said electric power converter to a constant low voltage, and said inverter control means includes said selection switch for selecting the pulse amplitude modulation controlling to pulse-amplitude-modulation-control said inverter converter for said motor and control means for controlling said power improving control means and said inverter control means.

8. A motor control apparatus for controlling a motor comprising:

a transformer for receiving an ac power and outputting different secondary voltages;

a switch for outputting one of different secondary voltages in accordance with a mode signal;

a smoothing capacitor;

an electric power converter including a rectifying circuit and a switching circuit for either charging said smoothing capacitor with an output of said switch or discharging said smoothing capacitor to supply a regenerative current from said motor to said transformer to control a voltage of said smoothing capacitor in accordance with said mode signal;

power factor improving means for controlling said electric power converter, adjusting a voltage of said smoothing capacitor, and improving a power factor of said motor control apparatus;

rotating speed detection means for detecting a rotating speed and a position of said motor to generate a rotating speed signal;

drive signal generation means including a pulse width modulation circuit and a pulse amplitude modulation circuit for generating either of first phase signals by said pulse width modulation circuit or second phase signals by said pulse amplitude modulation circuit in accordance with said mode signal, pulse widths of said first phase signals being controlled by said pulse amplitude modulation circuit in accordance with said rotating speed command signal and said rotating speed signal such that a difference between said rotating speed command signal and said rotating speed is reduced, said second phase signals being generated by said pulse amplitude modulation circuit such that a slip frequency between said second phase signals and rotation of a rotor of said motor is controlled in accordance with said rotating speed command signal and rotating speed signal;

an inverter circuit for generating driving signals supplied to said motor in response to an output of said drive signal generation means with power from said smoothing capacitor; and mode determining means for determining one of modes to generate said mode signal in accordance with a speed command signal and said rotating speed signal.

9. A motor control apparatus as claimed in claim 8, wherein said pulse width modulation circuit has a first memory for storing sets of different pulse width modulation switching data patterns and generates said first phase signals by successively outputting one of said pulse width modulation switching data patterns of one sets in accordance with said rotating speed signal and said rotating speed command signal and said pulse amplitude modulation circuit includes a second memory for storing a set of pulse amplitude modulation switching data patterns and generate said second phase signals by successively outputting one of said set of pulse amplitude modulation switching data patterns in accordance with said rotating speed signal.

10. A motor control apparatus as claimed in claim 8, further comprising a voltage detector for detecting a voltage of said smoothing capacitor, wherein said different secondary voltages includes a low ac voltage and a high ac voltage, said electric power converter controls said voltage of said smoothing capacitor to either of high or low output voltage, said modes includes first to sixth modes, said first mode is effected when said rotating speed signal is less than N0 and said rotating speed signal and said rotating speed command signal indicate acceleration, said second mode is effected when said rotating speed signal is not less than N0 and less than N1 which is greater than said N0 and said rotating speed signal and said rotating speed command signal indicate acceleration, said third mode is effected when said rotating speed signal is not less than N1 and less than N2 which is greater than said N1 and said rotating speed signal and said rotating speed command signal indicate acceleration, said fourth mode is effected when said rotating speed signal is substantially equal to N2 and said rotating speed signal and said rotating speed command signal indicate a constant rotating speed, said fifth mode is effected when said rotating speed signal is equal to or less than N2 and not less than N1 and said rotating speed signal and said rotating speed command signal indicate deceleration, said sixth mode is effected when said rotating speed signal is less than N0 and said rotating speed command signal indicates deceleration.

11. A motor control apparatus as claimed in claim 10, wherein, in said second mode, said switch outputs said high ac voltage and said electric power converter controls said voltage of said smoothing capacitor to said high output voltage using said voltage detector, and said drive signal generation means operates said pulse width modulation circuit.

12. A motor control apparatus as claimed in claim 10, wherein, in said fourth mode, said switch outputs said low ac voltage, said electric power converter controls said voltage of said smoothing capacitor to said low output voltage using said voltage detector, and said drive signal generation means operates pulse amplitude modulation circuit.

13. A motor control apparatus as claimed in claim 10, wherein, in said third mode, said switch outputs said high ac voltage, said electric power converter controls said output of said smoothing capacitor to said high output voltage using said voltage detector, and said drive signal generation means to operates pulse width modulation circuit.

14. A motor control apparatus as claimed in claim 10, wherein, in said first and sixth modes, said switch outputs said low ac voltage, said electric power converter controls said output of said smoothing capacitor to said low output voltage, and said drive signal generation means operates said pulse width modulation circuit.

15. A motor control apparatus as claimed in claim 8, wherein said different secondary voltages includes a low ac voltage and a high ac voltage, said electric power converter controls said output of said smoothing capacitor to a high output voltage and said switch outputs said high ac voltage when said rotating speed signal and said rotating speed command signal indicates acceleration and deceleration and said rotating speed is not less than a reference speed and said electric power converter controls said output of said smoothing capacitor to a low output voltage and said switch outputs said low ac voltage when said rotating speed signal and said rotating speed command signal indicates acceleration and deceleration and said rotating speed signal is less than said reference speed.

16. A motor control apparatus for a centrifugal apparatus as claimed in claim 1, further comprising rotating speed detection means for detecting a rotating speed of said motor to generate a rotating speed signal; and mode determining means for determining one of modes to generate said mode signal in accordance with a speed command signal and said rotating speed signal, wherein said switching means couples one of a plurality of said secondary voltage taps to said transformer in accordance with said mode signal and said inverter control means controls said inverter converter for switching between the pulse width modulation controlling and the pulse amplitude modulation in accordance with said mode signal.

* * * * *